(12) United States Patent
Allard

(10) Patent No.: US 9,512,606 B2
(45) Date of Patent: Dec. 6, 2016

(54) BIORETENTION SWALE OVERFLOW FILTER

(75) Inventor: Douglas Paul Allard, Santa Rosa, CA (US)

(73) Assignee: Oldcastle Precast, Inc., Atlanta, GA (US)

( * ) Notice: Subject to any disclaimer, the term of this patent is extended or adjusted under 35 U.S.C. 154(b) by 904 days.

(21) Appl. No.: 13/590,009

(22) Filed: Aug. 20, 2012

(65) Prior Publication Data

US 2013/0092632 A1    Apr. 18, 2013

Related U.S. Application Data

(60) Provisional application No. 61/525,839, filed on Aug. 21, 2011.

(51) Int. Cl.
| E03F 5/04 | (2006.01) |
| C02F 3/32 | (2006.01) |
| E03F 5/10 | (2006.01) |
| E03F 1/00 | (2006.01) |

(52) U.S. Cl.
CPC ............ *E03F 1/00* (2013.01); *C02F 3/327* (2013.01); *E03F 1/002* (2013.01); *E03F 5/0404* (2013.01); *E03F 5/103* (2013.01); *E03F 2005/0413* (2013.01)

(58) Field of Classification Search
CPC ............ E03F 1/00; E03F 1/002; E03F 5/04; E03F 5/0404; E03F 5/06; E03F 5/103; E03F 2005/04; E03F 2005/0413; C02F 3/32; C02F 3/327
USPC .............. 210/602, 747.3, 163, 170.03
See application file for complete search history.

(56) References Cited

U.S. PATENT DOCUMENTS

| 4,537,687 A | 8/1985 | Piper |
| 4,682,907 A | 7/1987 | Gaudin |
| 5,322,629 A | 6/1994 | Stewart |
| 5,437,786 A | 8/1995 | Horsley |
| 5,549,817 A | 8/1996 | Horsley |
| 5,569,387 A | 10/1996 | Bowne |
| 5,624,576 A | 4/1997 | Lenhart |
| 5,702,593 A | 12/1997 | Horsley |
| 5,707,527 A | 1/1998 | Knutson |
| 5,728,305 A | 3/1998 | Hawkinson |
| 5,744,048 A | 4/1998 | Stetler |
| 5,759,415 A | 6/1998 | Adams |

(Continued)

FOREIGN PATENT DOCUMENTS

WO    WO 2010/118110    10/2010

OTHER PUBLICATIONS

"Service Plaza Stormwater Project," Government Engineering, 40-41, May-Jun. 2007.

(Continued)

*Primary Examiner* — Christopher Upton

(57) ABSTRACT

An apparatus and method for use in conjunction with grassy swales to collect and filter or otherwise treat dirty or polluted storm water runoff or other fluid is disclosed. The swale overflow screen device is used in connection with a catch basin. One or more swale overflow screen devices are installed within a bioretention swale, such that during periods of routine flow, at least a portion of storm water runoff or other passing fluids can enter the swale overflow screen device, through the catch basin, and be released to a drainage system.

40 Claims, 10 Drawing Sheets

(56) References Cited

U.S. PATENT DOCUMENTS

| | | | |
|---|---|---|---|
| 5,788,848 A | 8/1998 | Blanche | |
| 5,855,775 A | 1/1999 | Kerfoot | |
| 5,985,157 A | 11/1999 | Leckner | |
| 6,027,639 A | 2/2000 | Lenhart, Jr. | |
| 6,132,603 A | 10/2000 | Mokrzycki | |
| 6,277,274 B1 | 8/2001 | Coffman | |
| 6,350,374 B1 | 2/2002 | Stever | |
| 6,383,373 B1 | 5/2002 | Nakao et al. | |
| 6,406,218 B1 | 6/2002 | Olson | |
| 6,511,595 B2 | 1/2003 | Crompton | |
| 6,531,059 B1 | 3/2003 | Morris et al. | |
| 6,569,321 B2 | 5/2003 | Coffman | |
| 6,641,720 B1 | 11/2003 | Crompton | |
| 6,649,048 B2 | 11/2003 | de Ridder | |
| 6,652,743 B2 | 11/2003 | Wallace et al. | |
| 6,676,832 B2 | 1/2004 | de Bruijn | |
| 6,783,683 B2 | 8/2004 | Collings | |
| 6,881,338 B2 | 4/2005 | Austin et al. | |
| 6,905,599 B2 | 6/2005 | Allard | |
| 6,991,114 B2 | 1/2006 | Allen, II | |
| 6,991,402 B2 | 1/2006 | Burkhart | |
| 6,991,734 B1 | 1/2006 | Smith | |
| 6,998,038 B2 | 2/2006 | Howard | |
| 7,022,243 B2 | 4/2006 | Bryant | |
| 7,080,480 B2 | 7/2006 | Urban et al. | |
| 7,083,721 B2 | 8/2006 | McClure et al. | |
| 7,101,476 B2 | 9/2006 | Kim | |
| 7,160,058 B2 | 1/2007 | Burkhart | |
| 7,186,058 B2 | 3/2007 | Schluter | |
| 7,186,333 B2 | 3/2007 | Kluge | |
| 7,237,981 B1 | 7/2007 | Vitarelli | |
| 7,294,256 B2 | 11/2007 | Happel et al. | |
| 7,296,692 B2 | 11/2007 | Allen, II | |
| 7,297,266 B2 | 11/2007 | Cobb | |
| 7,344,335 B2 | 3/2008 | Burkhart | |
| 7,425,262 B2 | 9/2008 | Siviter | |
| 7,425,262 B1 | 9/2008 | Kent | |
| 7,470,362 B2 | 12/2008 | Kent | |
| 7,510,649 B1 | 3/2009 | Lavigne | |
| 7,582,216 B2 | 9/2009 | Arnott et al. | |
| 7,625,485 B2 | 12/2009 | Siviter | |
| 7,638,065 B2 | 12/2009 | Stever | |
| 7,674,378 B2 | 3/2010 | Kent | |
| 7,686,956 B1 | 3/2010 | Casebier | |
| 7,776,217 B2 | 8/2010 | Lucas | |
| 7,833,412 B2 | 11/2010 | Holtz | |
| 7,967,979 B2 | 6/2011 | Grewal et al. | |
| 7,980,273 B2 * | 7/2011 | Robinson | E03F 1/00 210/170.03 |
| 7,985,335 B2 | 7/2011 | Allard | |
| 8,012,346 B2 | 9/2011 | Peters, Jr. et al. | |
| 8,110,105 B2 | 2/2012 | Allen, II | |
| 8,113,740 B2 | 2/2012 | Boulton et al. | |
| 8,287,728 B2 | 10/2012 | Kania et al. | |
| 8,303,816 B2 | 11/2012 | Kent et al. | |
| 8,318,015 B2 | 11/2012 | Allen, II et al. | |
| 8,333,885 B1 | 12/2012 | Iorio | |
| 8,501,016 B2 | 8/2013 | Lord | |
| 8,535,533 B2 | 9/2013 | Allard | |
| 8,555,586 B2 | 10/2013 | Lowe et al. | |
| 8,591,729 B2 | 11/2013 | Alqanee | |
| 8,622,647 B2 | 1/2014 | Flood, Jr. et al. | |
| 8,679,327 B2 | 3/2014 | Mellott et al. | |
| 8,795,518 B2 | 8/2014 | Alsaffar | |
| 8,980,083 B2 * | 3/2015 | Hutchings | C02F 3/327 210/170.03 |
| 2002/0057944 A1 | 5/2002 | Adams | |
| 2004/0226869 A1 | 11/2004 | McClure | |
| 2006/0124519 A1 * | 6/2006 | Glazik | E03F 5/0404 210/163 |
| 2006/0151387 A1 | 7/2006 | Yost et al. | |
| 2007/0068878 A1 | 3/2007 | Stever | |
| 2007/0199869 A1 | 8/2007 | Al-Assfour | |
| 2007/0262009 A1 | 11/2007 | Fitzgerald | |
| 2008/0121594 A1 | 5/2008 | Dierkes | |
| 2008/0217227 A1 | 9/2008 | Pank | |
| 2008/0217257 A1 | 9/2008 | Pank | |
| 2008/0251448 A1 | 10/2008 | Kent | |
| 2009/0050583 A1 | 2/2009 | Arnott | |
| 2009/0218299 A1 | 9/2009 | Cote | |
| 2009/0250405 A1 | 10/2009 | Allard | |
| 2010/0206790 A1 | 8/2010 | Holtz | |
| 2011/0147303 A1 | 6/2011 | Allard | |
| 2011/0186492 A1 | 8/2011 | Holtz | |
| 2012/0031854 A1 | 2/2012 | Allard | |
| 2012/0152827 A1 | 6/2012 | Allard | |
| 2012/0187031 A1 * | 7/2012 | Beatt | E03F 1/002 210/170.03 |
| 2013/0001158 A1 | 1/2013 | Condon et al. | |
| 2013/0056399 A1 | 3/2013 | Downare | |
| 2013/0105387 A1 | 5/2013 | Antoinette et al. | |
| 2013/0180903 A1 | 7/2013 | Kowalsky | |
| 2014/0001127 A1 | 1/2014 | Hymel et al. | |
| 2014/0124424 A1 | 5/2014 | Chai et al. | |
| 2014/0202954 A1 | 7/2014 | Lassovsky | |
| 2014/0367328 A1 * | 12/2014 | Allard | E03F 1/002 210/602 |

OTHER PUBLICATIONS

U.S. Patent and Trademark Office, Office Action for U.S. Appl. No. 13/263,291, Date Mailed: Aug. 29, 2013.

Rain Guardian, Four Stages of Pretreatment (U.S. Pat. No. 8,501,016), screen shots from http://www.rainguardian.biz/index.php?option=com_content&view=article&id=66&Itemid=103, printed on Jan. 2, 2014, 2 pages.

Terre Hill Storm Water Systems, slides entitled "Gray Complements Green, Gray + Green Treatment Train Design: Targets Multiple Urban Pollutants Reduces Maintenance Costs Extends Useful Life of Green Infrastructure Minimizes Urban Blight Enhances Quality of Urban Life," dated Oct. 10, 2012, downloaded on Jan. 2, 2014 from http://berkscd.com/wp-content/uploads/2012/10/Gray-Complements-Green.pdf, 8 pages.

Americast,"Standard Detail—4' Wide Precast Filterra Curb Inlet with Internal Bypass," DWG: STD_4_FTCB, dated Mar. 3, 2011.

Americast, "Standard Detail—6' Wide Precast Filterra Curb Inlet with Internal Bypass," DWG: STD_6_FTCB, dated Mar. 3, 2011.

Americast, "Standard Detail—8' Wide Precast Filterra Curb Inlet with Internal Bypass," DWG: STD_8_FTCB, dated Mar. 3, 2011.

Americast, "Standard Detail Gutter and Curb Opening Filterra Curb Inlet with Internal Bypass," DWG: DTL_FTCB_GCO, dated Apr. 4, 2011.

"Filterra Curb Inlet with Internal Bypass Design Guidelines California Region," Undated.

"Filterra Curb Inlet with Internal Bypass General Notes," Undated.

Filterra, "Sizing Table for 4' Wide Vault Filterra Curb Inlet with Internal Bypass," "Sizing Table for 6' Wide Vault Filterra Curb Inlet with Internal Bypass," "Sizing Table for 8' Wide Vault Filterra Curb Inlet with Internal Bypass," Undated.

Kristar Enterprises, Inc., "TreePod Biofilter with Internal Bypass (End Inlet)," Drawing No. TPB-IB-0001, dated Mar. 13, 2009.

Kristar Enterprises, Inc., "TreePod Biofilter with Internal Bypass (Side Inlet)," Drawing No. TPB-IB-0002, dated Mar. 13, 2009.

Kristar Enterprises, Inc., "TreePod Biofilter with External Bypass (End Inlet)," Drawing No. TPB-XB-0001, dated Mar. 3, 2009.

Kristar Enterprises, Inc., "TreePod Biofilter with External Bypass (Side Inlet)," Drawing No. TPB-XB-0002, dated Mar. 3, 2009.

PCT, International Search Report for International Application No. PCT/US 10/30206, Date of Mailing: Jun. 10, 2010.

PCT, Notification Concerning Transmittal of International Preliminary Report on Patentability (Chapter I of the Patent Cooperation Treaty) for International Application No. PCT/US2010/030206, Date of Mailing: Oct. 20, 2011.

Third-Party Preissuance Submission Under 37 CFR 1.290 filed in the U.S.P.T.O. on Oct. 30, 2012 in connection with U.S. Appl. No. 13/214,230.

Third-Party Preissuance Submission Under 37 CFR 1.290 filed in the U.S.P.T.O. on Feb. 4, 2013 in connection with U.S. Appl. No. 13/214,230.

(56) References Cited

OTHER PUBLICATIONS

Office action mailed on Dec. 27, 2012 in connection with U.S. Appl. No. 12/977,015.
PCT International Search Report and Written Opinion for International Application No. PCT/US 2014/042077, date of mailing Aug. 12, 2014 (11 pages).
USPTO Office Action for U.S. Appl. No. 13/214,230, notification date Apr. 15, 2014 (13 pages).
USPTO Office Action for U.S. Appl. No. 12/977,015, notification date May 22, 2014 (25 pages).

\* cited by examiner

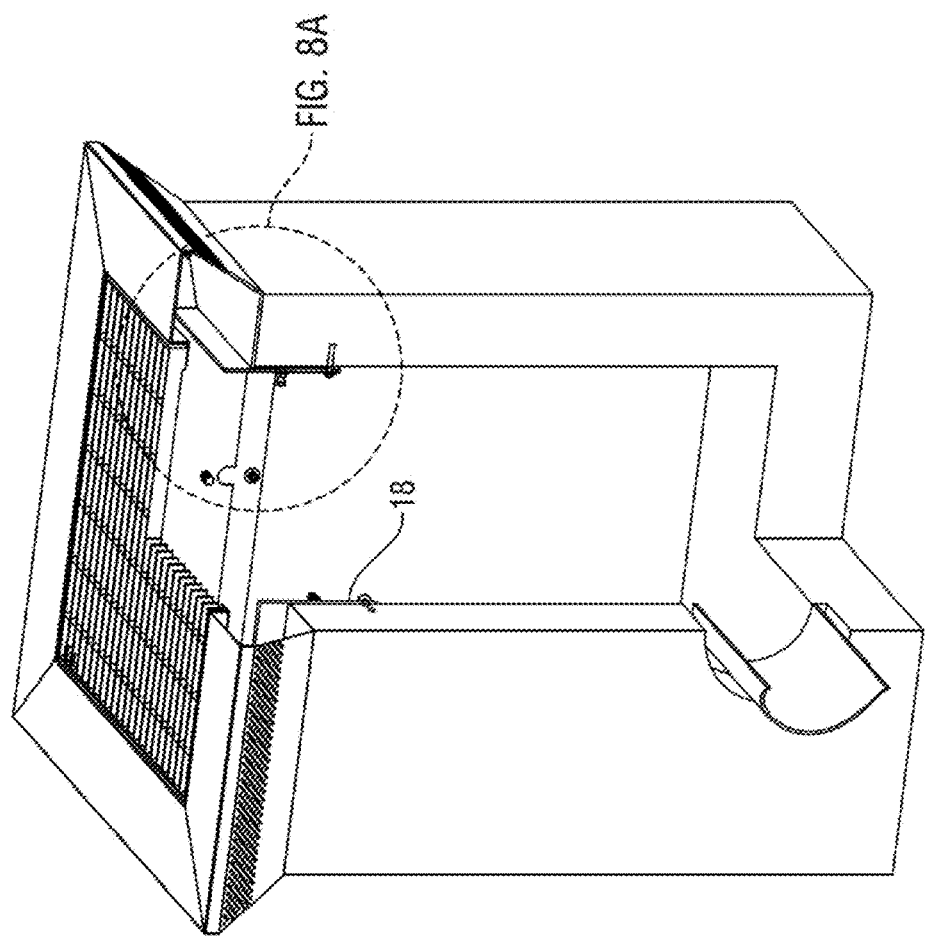
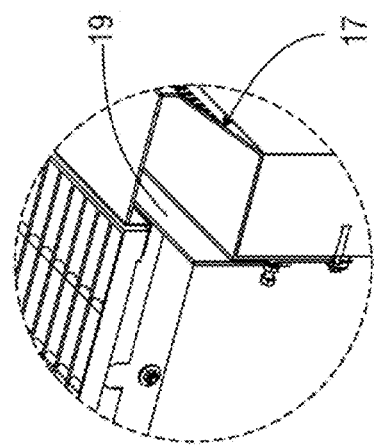

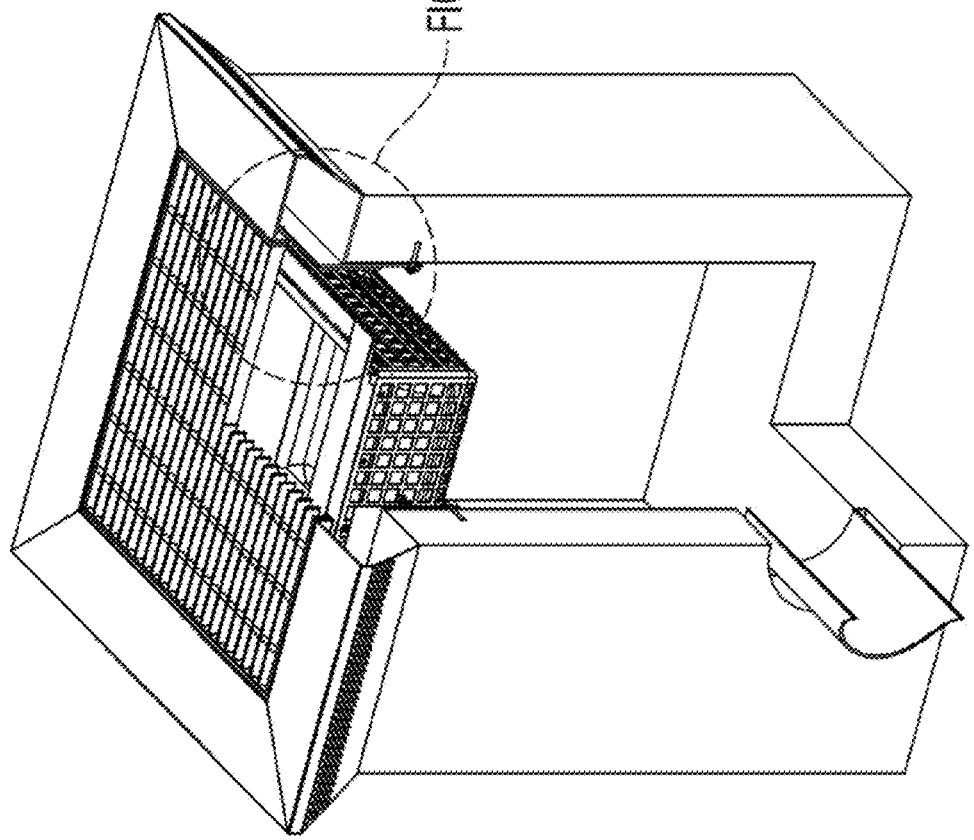
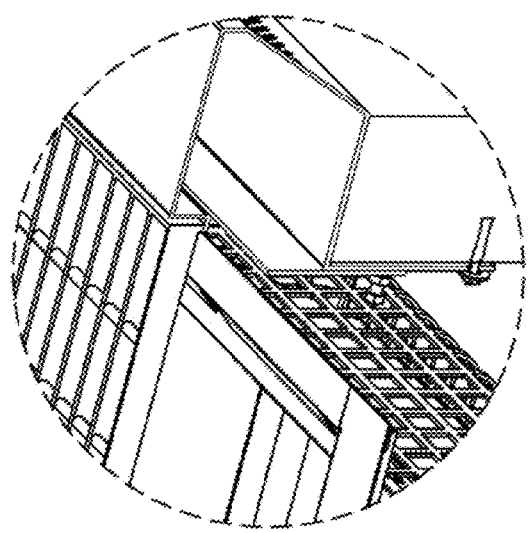
FIG. 10A
FIG. 10B

BIORETENTION SWALE OVERFLOW FILTER

CROSS-REFERENCE TO RELATED APPLICATIONS

This application claims the benefit of U.S. application Ser. No. 61/525,839, filed Aug. 21, 2011, the contents of which are herein incorporated by reference.

FIELD OF THE INVENTION

The present invention relates generally to apparatuses and methods for treating or filtering fluids, and more particularly to apparatuses and methods for use in conjunction with bioretention swales to collect and filter dirty or polluted water.

BACKGROUND OF THE INVENTION

In response to tighter guidelines recently imposed by environmental and regulatory agencies, the control of pollution, silt and sediment found in storm water runoff and other sources of water is receiving ever-increasing attention at all levels of federal, state, and local government. Federal and state agencies have issued mandates and developed guidelines regarding the prevention of non-point source (storm water caused) pollution that require action by governmental entities. These mandates affect the management of water runoff from sources such as storms, slopes, and construction sites, in addition, there are many other laws and regulations in place that restrict the movement or disposal of significant amounts of water. Such laws and regulations have a significant impact on, for example, the ways that states, municipalities, highway authorities and other responsible bodies can drain or otherwise dispose of storm runoff or other water falling on or passing over highways, roadways, parking lots and the like.

Bioretention swales, also known as grassy swales grassy drainage vegetated swales, bioretention swales, or simply "swales," are a common and well known way of filtering, treating and/or draining storm runoff or other dirty water that falls on and/or passes over highways, roadways, parking lots and the like. Swales function as soil and vegetation-based filtration systems, removing pollutants through a variety of physical, biological, and chemical treatment processes. The interaction of fluid with vegetation in the swale promotes a more even distribution of the fluid and retention of sediments. Such swales are routinely designed as one or more parts of an overall drainage infrastructure for storm water runoff, along with other less aesthetically pleasing elements, such as gutters, dams, sewers, aqueducts and the like. Unlike many of these other structures, however, grassy swales are preferred for their more pleasing appearance and their ability to provide a natural means for filtering and otherwise treating passing storm water or fluid runoff.

In a typical application, a swale is specifically sized to handle the estimated amount of runoff from an adjacent land improvement for a given time period, for example, ten years. At that time, the party responsible for the swale, such as a municipality highway authority, developer or property owner, will typically conduct a reconstructive overhaul or replanting of the grass layer in the swale, as it is only a matter of time before pollutants and contaminants overrun the grass and topsoil layers of the swale. Frequently, such an overhaul or reconstruction may be needed ahead of schedule, due to the generally incessant flow of chemicals and pollutants from roadways and similar structures that are washed into swales and drainage systems by storms and other runoff events. Such overhauls or reconstructions are costly and time consuming, and additional problems may ensue in the event that they are delayed or needed ahead of schedule. For example, a weak or failing swale may undesirably pass an inordinate amount of pollutants, sedimentation and other debris onward into a subsequent drainage system during the time that it takes to overhaul or replant the swale. In addition, as regulations tighten or various applications require a higher standard of filtration or pollutant removal, many typical swales and other current methods and systems for removing pollutants normally found in storm water runoff, including hydrocarbons, nitrates, and phosphates, may prove to be inadequate.

Although a swale may offer removal of ultra-fine and dissolved and dissolved constituents, gross pollutants such as coarse sediment, trash and debris can reduce system efficiency and increase maintenance needs. During periods of high storm water flow, swales may have limited capacity to process large quantities of fluid. Swales may not be able to process all of the storm water, for example, during heavy rain hill events. Backups that result in localized flooding of the surrounding areas may occur as a result. In some instances, swales may be used with an underground drainage basin system to catch high storm water flows. The drainage basin systems can catch overflow and release the excess fluid flow into underground drain and piping systems. Trash and debris, however, may also accumulate and be released into the drain and piping systems, along with the overflow storm water.

Accordingly, there exists a need for more effective methods and apparatuses for filtering and treating polluted or dirty water, such as storm water runoff, falling on or passing over highways, roadways, parking lots and the like. In particular, there exists a need for alleviating the work load carried by some grassy swales that allows for capture of floatables, trash, and other debris.

SUMMARY OF THE INVENTION

The present invention provides more effective methods and apparatuses for filtering and treating polluted or dirty water, such as storm water runoff, that passes over highways, roadways, parking lots and the like. The present invention provides a pollutant retention device that is associated with the fluid flow from a bioretention cell, such as a grassy swale. One particular advantage of the present invention is the ability to process storm water during periods of peak flow and reduce the workload required by swales to remove the required amount of sedimentation, silt and pollution over the course of their life spans.

Another advantage of the present invention is the ability to retain gross pollutants, such as floatables, trash, debris, and coarse sediment, within a bioretention cell, without impeding peak flow bypass needs. The present invention may be adjustable, allowing ponding depth to be set meet site specific conditions enhancing system hydraulic and filtering performance.

One embodiment of the present invention provides an apparatus adapted to cooperatively engage with a bioretention cell, comprising: an upper framework comprising angled side surfaces; perforations along at least one angled side surface, wherein the perforations are sized to allow for fluid flow from the bioretention swale; and a lower framework comprising an outlet for fluid flow.

The apparatus further comprises a grate disposed along the top of the upper portion of the apparatus. The perforations are disposed along the top portion of the angled side surface. The apparatus is connected to an underground drainage system. A lower portion of the apparatus is sized to cooperatively engage with a walled basin, and at least one angled side surface extends substantially horizontally to form a substantially horizontal ledge, and wherein the ledge rests along a top surface of the walled basin.

In another embodiment, the present invention provides a method of processing fluid from a bioretention cell, comprising selecting an inlet of a bioretention swale; selecting a bioretention swale overflow filter; coupling said bioretention swale to said bioretention swale overflow filter; and passing fluid through said bioretention swale overflow filter.

The bioretention swale overflow filter comprises: an upper framework comprising angled side surfaces; perforations along at least one angled side surface, wherein the perforations are sized to allow for fluid flow from the bioretention swale; and a lower framework comprising an outlet for fluid flow. The apparatus further comprises a grate disposed along the top of the upper portion of the apparatus. The perforations are disposed along the top portion of the angled side surface. The apparatus is connected to an underground drainage system. A lower portion of the apparatus is sized to cooperatively engage with a walled basin. At least one angled side surface extends substantially horizontally to form a substantially horizontal ledge, and wherein the ledge rests along a top surface of the walled basin.

Other apparatuses, methods, features and advantages of the invention will be apparent to one with skill in the art upon examination of the following figures and detailed description. All such additional systems, methods, features and advantages are included within this description and are encompassed within the scope of the invention.

BRIEF DESCRIPTION OF THE DRAWINGS

The included drawings are for illustrative purposes and provide examples of possible structures for the disclosed inventive swale overflow filter. These drawings in no way limit any changes in form and detail that may be made to the invention by one skilled in the art without departing from the spirit and scope of the invention.

FIGS. 8A and 8B illustrate schematically a corner cut away view of an embodiment of the present invention with an adjustable interior weir.

FIGS. 10A and 10B illustrate schematically a corner cut away view of an embodiment of the swale overflow filter that is fitted with a filter basket insert.

DETAILED DESCRIPTION

Figure 1:
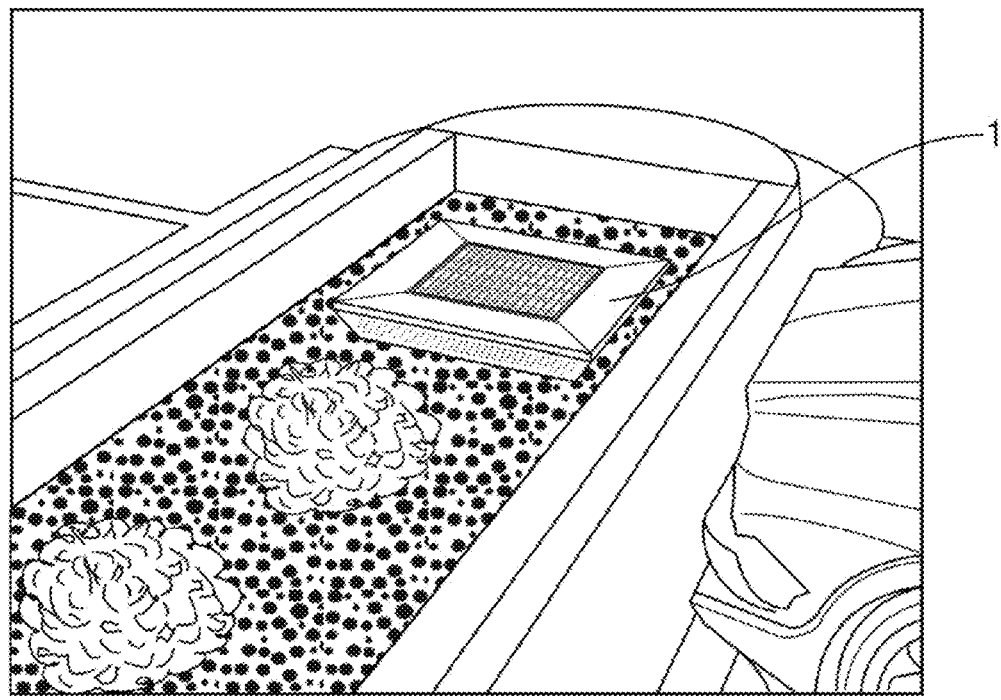
FIG. 1 illustrates in an angled top perspective view an example of a swale overflow filter installed in a rectangular area.

As used herein, the terms "comprises," "comprising," "includes," "including" "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and similar or equivalent to those described herein can be used in the practice or testing of the present invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Example applications of systems and methods according to the present invention are described in this section. The examples are being provided solely to add context and aid in the understanding of the invention. Other applications are possible, such that the examples should not be taken as limiting.

In the following detailed description references are made to the accompanying drawings, which form a part of the description and in which are shown, by way of illustration, specific embodiments of the present invention. Although these embodiments are described in sufficient detail to enable one skilled in the art to practice the invention, these examples are not limiting. Other embodiments may be used, and changes may be made without departing from the spirit and scope of the invention.

One advantage of the present invention is the provision of more effective methods and apparatuses for filtering and treating polluted or dirty water, such as storm water runoff, that passes over highway's, roadways parking lots and the like, such that whatever fluid eventually makes its way into a final drainage infrastructure or destination is likely to be cleaner. This advantage is realized by providing an apparatus and method for processing water runoff or other fluid when such fluid enters a water treatment system, such as a grassy swale.

Another advantage of the present invention is the reduction of the workload required of one or more grassy swales in terms of the amount of sedimentation, silt and pollution that they are required to be removed over the course of their life spans. These advantages can be accomplished by installing a swale overflow filter to be used in conjunction with a grassy swale, such that at least a portion of storm water runoff or other passing fluids can be processed through the swale overflow filter during high flow events. These and other useful objects are achieved by the improved devices and methods disclosed herein.

Referring now to FIG. 1, an application of the swale overflow filter 1 is shown installed in a bit retention swale. The top surface of the swale overflow filter (with the grate) is positioned such that it is set above the top surface of the bioretention swale.

Figure 2:
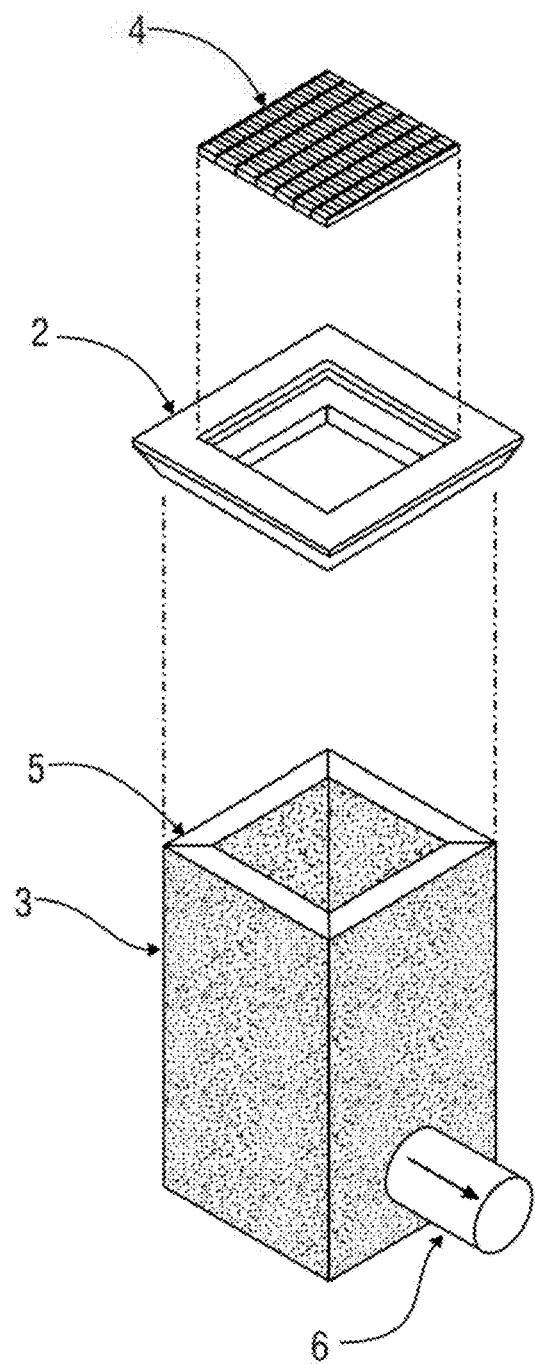
FIG. 2 illustrates in expanded angled side view an exemplary swale overflow filter.

As illustrated in FIG. 2 an exemplary swale overflow filter is shown expanded angled side view. The upper portion of the swale overflow filter 2 is set above a concrete catch basin 3, in particular, the swale overflow filter has an upper portion that rests above the concrete basin. The upper portion includes a frame that tapers along the sides and then forms a substantially horizontal ledge (not shown) that allows the device to rest on the top surface of the catch basin. The upper portion of the swale overflow filter also includes a top opening through which storm water can pass.

The upper portion of the device includes a grate, plug, or cover panel that can be removed to allow access to the device for cleaning or maintenance. The outer edge of the grate 4 can be sized to fit within along an inner lip or ledge surrounding the top opening of the swale overflow filter. The grate or panel includes grids, preferably of metal bars, although other suitable rigid and durable materials may be used, that at least partially obstructs fluid flow through the top opening of the swale overflow filter.

The sides of the upper portion of the device extend down at an angle, for example at about a 30 degree angle from the edge of the top portion. The sides of the upper portion include numerous perforations along all our outer flow walls. The perforations can be circular in shape and placed along the sides in a repeating pattern, or take any other shape and pattern recognized by those of skill in the art. The perforations are placed along the upper flow walls toward the top of the swale overflow filter. The perforations are sized and placed to accept storm water flowing from the swale and allow the storm water to enter the swale overflow filter, while keeping pollutants, debris, or other floatables from entering the drain. In this way, the perforations form a "screen" to allow for select flow through the sides of device.

The swale overflow filter tapers into a substantially horizontal ledge and then forms a lower portion below the horizontal ledge. The lower portion, which is narrower than the upper portion, rests within the concrete catch basin. Expansion bolts 5 are included along upper corners of the concrete basin for mounting bottom facing surfaces of the swale overflow filter to the catch basin. Such attachments may also be made via welds, clamps, brackets, ties or any other suitable means known in the art for affixing one surface to the other. An outlet pipe or overflow drain 6 located toward the bottom of the catch basin releases fluid passing, through the concrete catch basin into underground piping or a water detention system.

Figure 3:
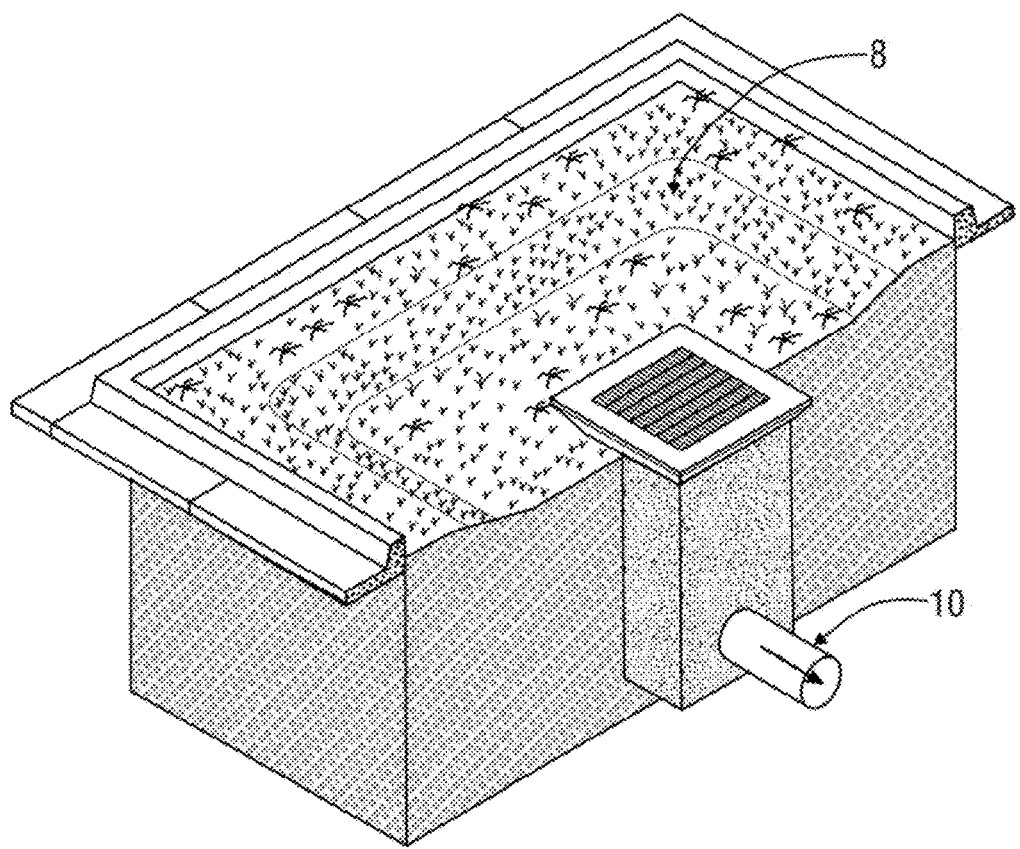
FIG. 3 illustrates a cross-sectional view of a swale overflow filter installed with a catch basin in a bioretention swale according to one embodiment of the present invention.
Figure 4:
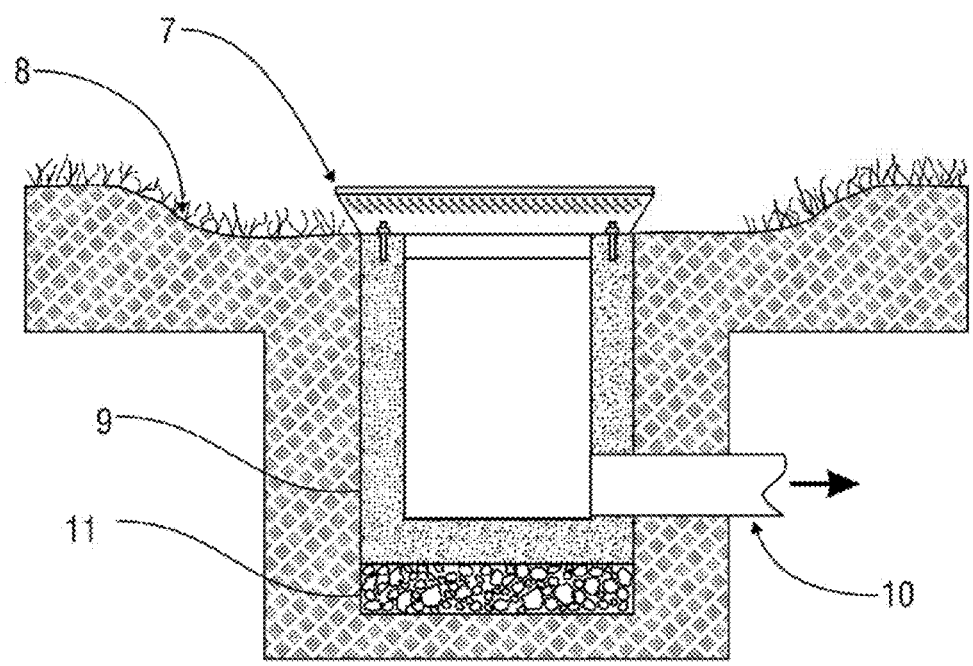
FIG. 4 is an illustration of another cross-sectional view of to swale overflow filter installed with a catch basin in a bioretention swale according to one embodiment of the present invention.

FIGS. 3 and 4 show an embodiment of the swale overflow filter 7 installed in a bioretention swale 8. In a typical application, a bioretention swale comprises a depression in the ground adjacent to a land improvement such as a highway, road, parking lot, subdivision or other similar development. The depression is substantially covered with a layer of grass or other vegetation that has become well rooted and established within the swale. The type of grass or other suitable vegetation may be one of any number of different types, as will be readily understood by one skilled in the art, with such a type being capable of naturally removing pollutants from storm water or other fluid runoff as the fluid infiltrates the soil. The ground underneath the grass layer may be comprised of one or more layers, with a top layer preferably of soil that is conducive to the growing of grass or other like vegetation, a middle layer of gravel or coarse dirt, and a bottom layer of clay or bedrock. Such ground levels are not necessary, and alternative ground configurations are possible, as known in the art.

Figure 5:
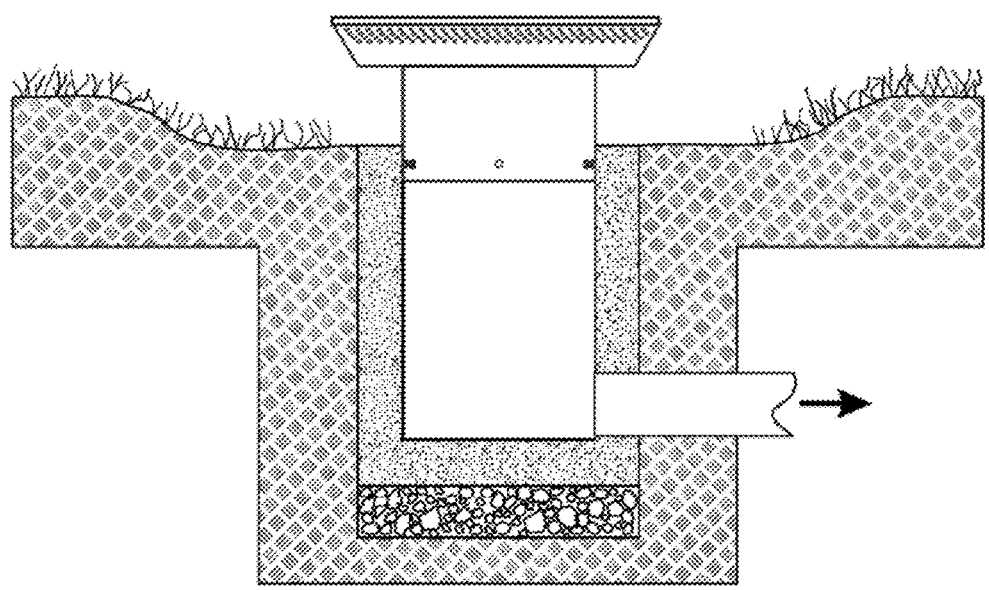
FIG. 5 illustrates a cross-sectional view of a swale overflow filter with an adjustable height, installed with a catch basin in a bioretention swale.

The swale overflow filter can be placed in a hole in the bioretention swale. The upper portion of the swale overflow filter is set above a catch basin 9 with an overflow drain 10. The height of the swale overflow filter, particularly the height of the upper portion of the device, may be adjusted. As shown in FIGS. 4 and 5, the height is adjustable, allowing the ponding depth to be set to meet site specific conditions. In one embodiment, the perforations are placed to allow for a minimum ponding depth of three inches. The ponding depth of the swale overflow filter can also be adjusted by placing a moveable wall or a weir within the system, as shown in FIGS. 7 and 8, discussed below.

Fluid from the grassy swale can accumulate in an adjacent area in the bioretention swale until it reaches the height of the lower perforations along the side of the overflow filter. The fluid enters the swale overflow filter through the side perforations. Fluid can enter the overflow filter through the top grate. In one embodiment, the overflow filter can serve as a bypass (for example, during high flow conditions) for fluid accumulating in the swale in that at least some fluid can be directed to the overflow filter instead of the neighboring street to cause flooding. In addition, should there be sufficiently high flow conditions, the fluid may presumably accumulate to the point where it rises above the level of the highest side perforations. When this occurs, the fluid can alternatively enter the underground overflow drainage system through the top grate in the overflow filter. The presence of a grate along the top and perforations along the side ensure that trash, gross pollutants, and other debris are filtered from storm water and do not enter the overflow drain.

In a preferred embodiment, the top elevation of the catch basin is placed at or below the lower surface of the swale to allow for storm water to pond or accumulate above the catch basin. The catch basin can have a closed or open bottom, and it can optionally rest on lining or bedding 11. In another preferred embodiment, the outlet pipe can be below one or more grassy swale layers, such that passing fluid may more readily proceed to its ultimate drainage destination. Alternatively, the outlet pipe from the can also be designed to release water at the surface level to allow contact with the swale as originally intended, in this configuration, the overflow filter allows for at least some pre-filtration of storm water entering the bioretention swale.

The top face of the swale overflow filter can be substantially rectangular or square in shape. The device can also be circular in shape to fit overflow drains that are round. The filter can be sized to cooperatively engage with a bioretention swale and for the water collection needs of the swale. For example, the outer dimensions of the top face can be larger than the inner dimensions of the catch basin in which the filter rests. In one embodiment, the top face measures about 26" in length and 26" in width (26"×26"), while the inside of the catch basin measures about 12" in length and 12" in width (12"×12"). In another embodiment, the top face measures about 34"×34," and the inside of the catch basin measures about 18"×18." In another embodiment, the top face measures about 40"×40," and the inside of the catch basin measures about 24"×24." In another embodiment, the top face measures about 36"×36," and the insides of the catch basin measures about 54"×54." In a rectangular embodiment, the top face measures about 40"×54" and the inside of the catch basin measures about 24"×36." In each of these examples, the upper portion of the overflow filter can stand about 6" above ground level.

Figure 6:
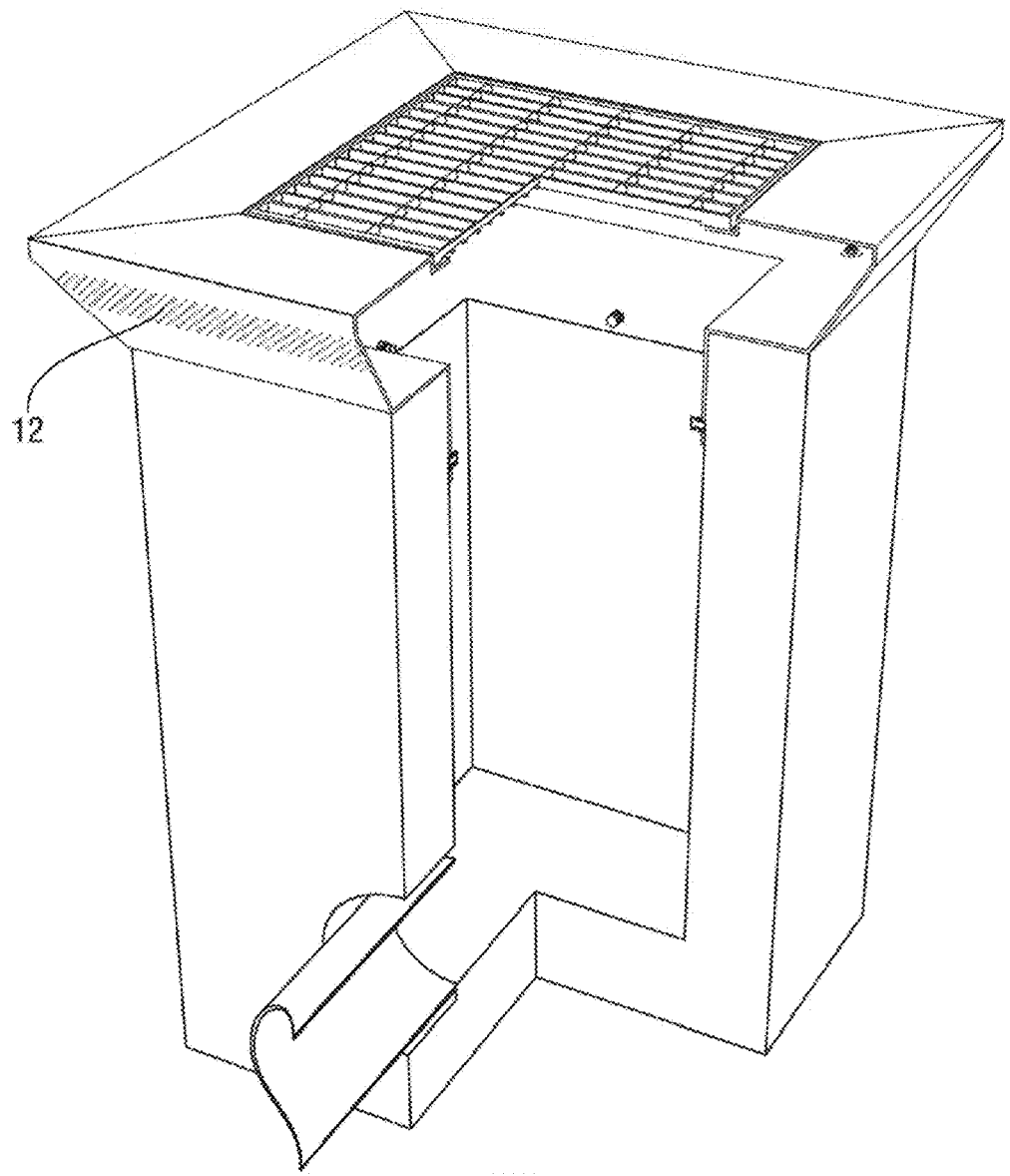
FIG. 6 illustrates an angled side cutout view of a swale overflow filter connected to a catch basin with an overflow drain.

FIG. 6 shows an embodiment of the swale overflow filter of the instant invention. Perforations 12 are located along all four sides of the upper portion of the device. The upper portion tapers along, the side and forms a substantially horizontal ledge. The ledge rest on a top surface of a substantially rectangular catch basin with an overflow drain. The swale overflow filter may be connected to the catch basin using bolts or other connections along the horizontal ledge. The device also may be connected to the catch basin using bolts or other connections along a vertical wall of the device. Alternatively, the system may be constructed as a single unit. The swale overflow filter may be placed within a grassy swale adjacent to a parking lot, as shown in FIG. 1. Fluid accumulated in a grassy swale passes through the perforations at the angled side of the swale overflow filter, into the device, and through the overflow drain at the bottom of the catch basin.

In another embodiment, the swale overflow filter may include an internal wall or a weir placed along a vertical wall of the filter. The use of a removably mounted weir allows the water depth in the filter to be adjusted without having to adjust the entire device. Then a filter medium can be placed around the inside perimeter of the device for the collection of hyrdrocarbons, very fine sediments, metals, oils and grease, organics, or bacteria that may escape the swale surface during high flows. The media used can be customized to target specific pollutants or meet site specific pollutant removal criteria. The ordinary artisan will recognize a wide range of media are available and can be used in the media filter applications of the present invention. The filter medium can include, without limitation, pouches filled with Perlite (fossil rock) placed around the inside perimeter of the device for the collection of hyrdrocarbons that may escape the swale surface during high flows.

Figure 7B:
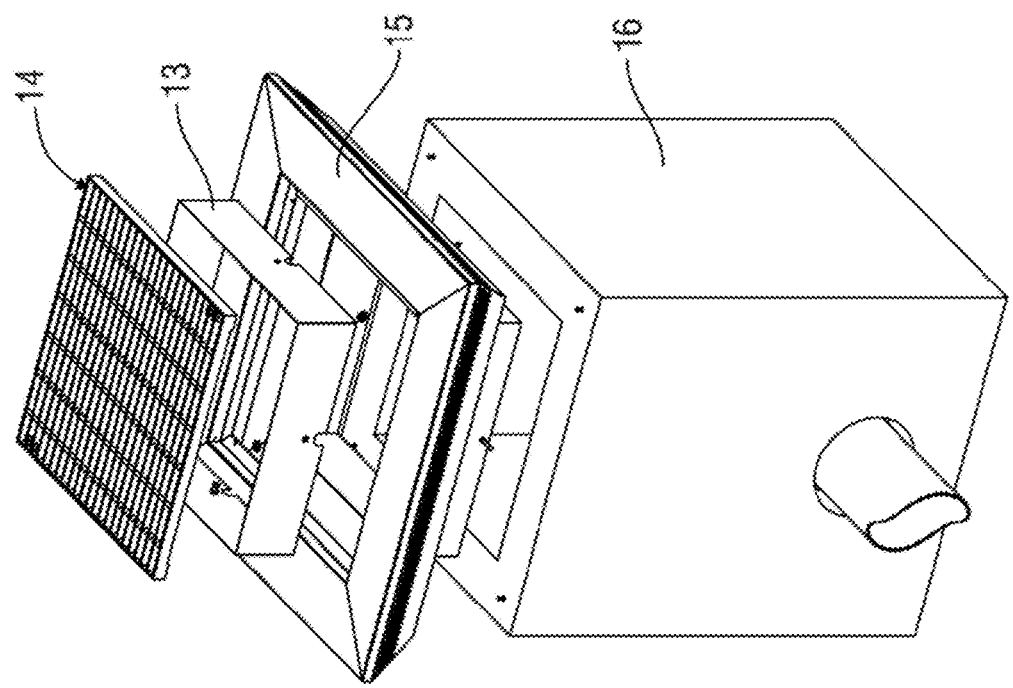
FIGS. 7A and 7B illustrate schematically a side angle view of an embodiment of the present invention with an adjustable interior weir.
Figure 7A:
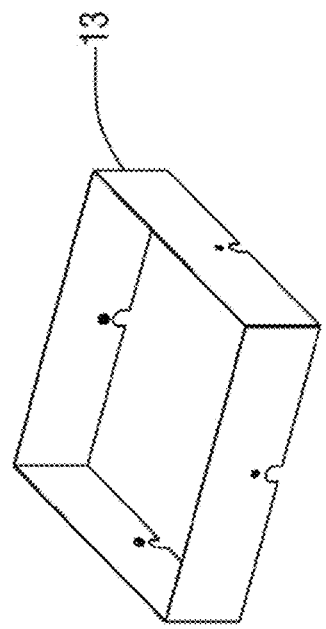

As shown schematically in FIGS. 7A and 7B, the internal weir 13 can include a square or rectangular tube with four side walls and an open top. The weir is positioned below the cover panel or grate 14 and within walls of the swale overflow filter 15, which is coupled to a catch basin 16. As shown schematically in FIGS. 8A and 8B, when installed in a swale overflow filter device 17, the weir can be removably mounted to the vertical portion of the swale overflow filter 18 at varying locations, using spot weld nuts, bolts, or any fastening mechanism known in the art. The top of the weir may be placed at varying heights in relation to the perforated, angled side surfaces of the upper portion of the swale overflow filter. For example, the top edge of the weir can be placed at the same level as the bottom of the angled sides of the swale overflow filter (now shown). During periods of routine flow, fluid entering from the side perforations flows below to the catch basin. However, as shown in FIGS. 8A and 8B, the top edge of the weir can be raised (i.e., placed at a higher level in relation to the bottom of the perforated, angled side surfaces). At this placement, the weir at least partially obstructs the flow of fluid entering from the bioretention swale, as the fluid flow is hindered by the weir 19 and allowed to accumulate to a desired ponding depth within the upper portion of the swale overflow filter. After it reaches the top edge of the weir, fluid passes over the weir and into the catch basin below. To further increase the ponding depth, the weir can be mourned even higher alone vertical portion of the device. The weir can be constructed of stainless steel, 16-gauge steel, powder coated steel, plastic, wood, or any material known in the art.

Figure 9:
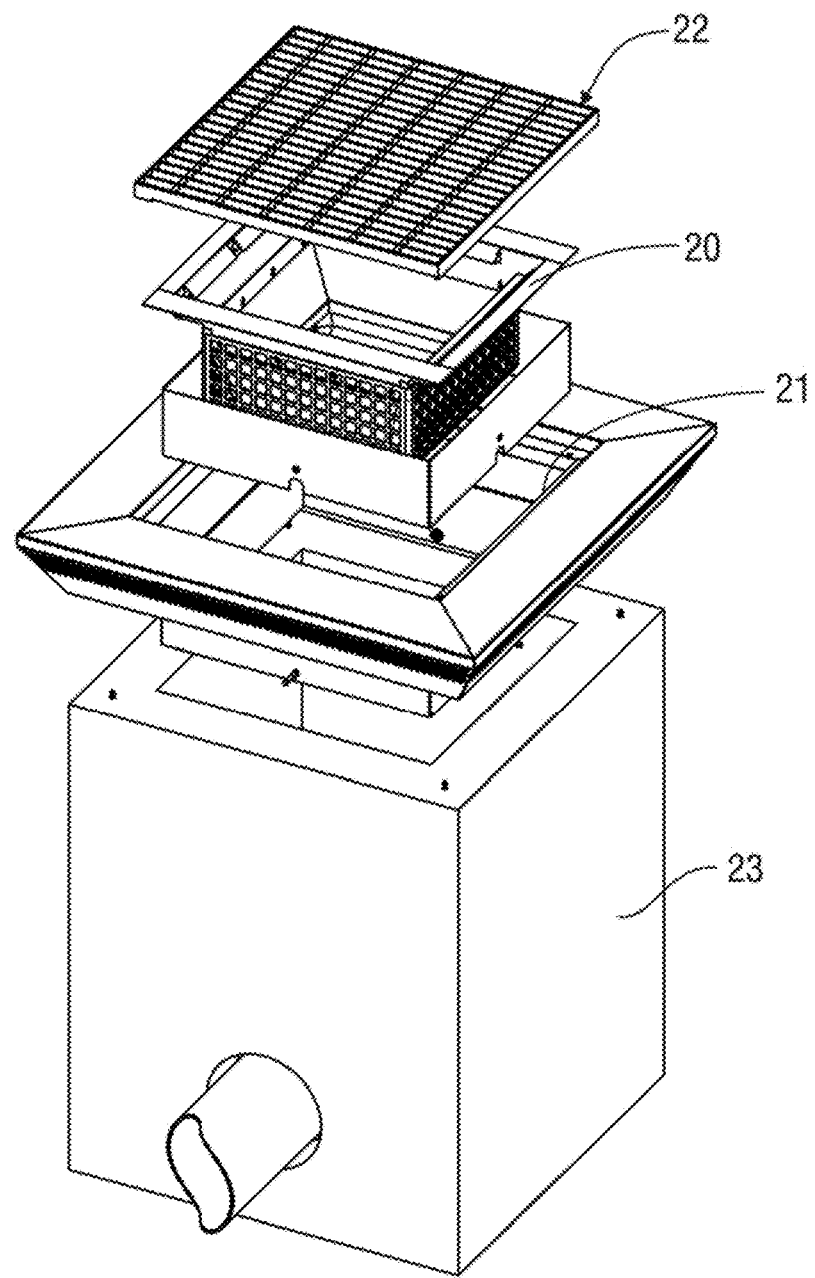
FIG. 9 illustrates in expanded angled side view an embodiment of the swale overflow filter that is fitted with a filter basket insert.

In addition the upper portion of the swale overflow filter can incorporate a range of different filtration devices. The ordinary artisan will recognize that the top face opening of the swale overflow filter can also be adapted to accept a standard industry filter insert that collects and retains floatables during, bypass flows. The filter insert can include, without limitation, one of many catch basin inserts known in the art, such as a "filter basket" that captures coarse debris, sediment, and other gross pollutants. In one embodiment, the filter basket is a drop-in style filter that is removable, such as the FloGard+PLUS® multipurpose catch basin insert designed to capture sediment, debris, trash, and oils and grease (KriStar Enterprises, Inc., Santa Rosa, Calif.). As shown in FIG. 9, an outer edge of the filter basket 20 is set on an inner load bearing surface 21 located along a top face of the filter. In this embodiment, the exterior facing top surface also includes a cover panel 22 to allow water to percolate back into swale, while retaining gross pollutants. During periods of high storm water flow, fluid accumulates toward the top of the swale overflow filter. The fluid bypasses the lower outlet opening in the catch basin 23 and instead exits the system through the top face of the swale overflow filter. Floatables, such as trash and debris, are retained, within the filter basket insert, an embodiment of which is shown in more detail in FIGS. 10A and 10B. The use of a filter basket insert in this way can allow for complete trash capture, even during peak storm water flow events.

The swale overflow filter of the present invention can be constructed using various materials and in dimensions known by those of skill in the art. As an example, the device may be fabricated from 16 gauge mild steel, with a durable powder coated finish. Other materials are known to provide for the appropriate rigidity and strength for as given application. The overflow filter can be sized to accommodate various flow rates in bioretention swales.

In yet another embodiment, the swale overflow filter of the instant, invention can be installed in various configurations and with different catch basin systems to improve the capacity and performance of a bioretention swale. For example, the swale overflow filter can be a module used as part of a larger bioretention system to improve filtration and storm water management within a system, such as in a parking lot. The swale overflow filter can be installed during initial site construction or be retrofit into an existing parking lot with a bioretention swale. In one embodiment, the swale overflow filter can be designed to fit most industry standard overflow drains. The swale overflow filter improves the capacity and effectiveness of the bioretention swale in the parking, lot.

Also, as shown in FIG. 1, the bottom portion the swale overflow filter can be installed within a trench system. The trench system has walls that surround the swale on at least on two sides. The trench can have piping that connects fluid flowing from the swale overflow filter to a larger network of underground pipes located, below the park lot.

Multiple swale overflow screen devices may also be used—alone or in connection with other storm water management devices—to increase the capacity and improve processing of storm water in bioretention swales. As a further embodiment, the swale overflow screen device may be used with various filtration elements and various catch basin designs known in the art to allow for additional filtration or bypass of storm water before it enters underground drainage systems. The swale overflow screen devices are also useful for extending the life and treatment capacity of bioretention swales.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the forgoing details, but rather is to be defined by the scope of the appended claims. Various modifications, alternative constructions, design options, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

What is claimed is:

1. An apparatus adapted to cooperatively engage with a bioretention swale, comprising:
   (a) a rectangular top frame comprising at least one depressed surface along an inner perimeter of the rectangular top frame;
   (b) a plurality of side surfaces descending substantially downwardly from an outer perimeter of the rectangular top frame, wherein at least one side surface comprises a plurality of side openings positioned to permit substantially horizontal fluid flow therethrough;
   (c) an L-shaped lower ledge disposed below the plurality of side surfaces, the L-shaped lower ledge comprising a substantially horizontal region and a substantially vertical region, wherein the substantially horizontal region is formed from a substantially horizontal, inward extension of at least one side surface; and
   (d) a cover panel comprising a plurality of top openings, wherein at least a portion of the cover panel is disposed above the depressed surface of the rectangular top frame and at least a portion of the cover panel is impermeable to fluid flow.

2. The apparatus of claim 1, further comprising a walled basin disposed below the rectangular top frame, wherein the walled basin comprises at least one outlet opening.

3. The apparatus of claim 2, wherein the L-shaped lower ledge is connected to the walled basin at the substantially vertical region of the lower ledge.

4. The apparatus of claim 3, wherein the L-shaped lower ledge is removeably connected to the walled basin at the substantially vertical region of the lower ledge.

5. The apparatus of claim 4, wherein the height for the connection of the L-shaped lower ledge to the walled basin is adjustable.

6. The apparatus of claim 2, wherein the L-shaped lower ledge is connected to a walled basin at the substantially horizontal region of the lower ledge.

7. The apparatus of claim 2, wherein the walled basin is disposed on bedding.

8. The apparatus of claim 1, wherein the plurality of side surfaces descend from an outer perimeter of the rectangular top frame at an angle measuring less than 90 degrees.

9. The apparatus of claim 1, further comprising a filter basket, wherein the outer perimeter of a top face of the filter basket rests along the depressed surface of the rectangular top frame.

10. The apparatus of claim 1, wherein at least one side opening of at least one side surface is adapted to receive fluid from a bioretention swale.

11. An apparatus adapted to cooperatively engage with a bioretention swale, comprising:
   (a) a rectangular top frame comprising at least one depressed surface along an inner perimeter of the rectangular top frame;
   (b) a plurality of side surfaces descending from an outer perimeter of the rectangular top frame, wherein at least one side surface comprises a plurality of side openings;
   (c) an L-shaped lower ledge disposed below the plurality of side surfaces, the L-shaped lower ledge comprising a substantially horizontal region and a substantially vertical region, wherein the substantially horizontal region is formed from a substantially horizontal, inward extension of at least one side surface;
   (d) a cover panel comprising a plurality of top openings, wherein at least a portion of the cover panel is disposed above the depressed surface of the rectangular top frame and at least a portion of the cover panel is impermeable to fluid flow; and
   (e) a walled basin disposed below the rectangular top frame, wherein the walled basin further comprises an interior weir connected to an interior surface of the substantially vertical region of the L-shaped lower ledge.

12. The apparatus of claim 11, wherein the top edge of the interior weir is disposed above the substantially horizontal region of the L-shaped lower ledge, adjacent to at least a portion of a side surface, said apparatus further comprising filter media disposed between the interior weir and the side surface.

13. An apparatus adapted to cooperatively engage with a bioretention swale, comprising:
   (a) a rectangular top frame comprising at least one depressed surface along an inner perimeter of the rectangular top frame;
   (b) a plurality of side surfaces descending from an outer perimeter of the rectangular top frame, wherein at least one side surface comprises a plurality of side openings;
   (c) an L-shaped lower ledge disposed below the plurality of side surfaces, the L-shaped lower ledge comprising a substantially horizontal region and a substantially vertical region, wherein the substantially horizontal region is formed from a substantially horizontal, inward extension of at least one side surface;
   (d) a cover panel comprising a plurality of top openings, wherein at least a portion of the cover panel is disposed above the depressed surface of the rectangular top frame and at least a portion of the cover panel is impermeable to fluid flow; and (e) a walled basin disposed below the rectangular top frame, wherein the walled basin further comprises an interior weir removeably connected to an interior surface of the substantially vertical region of the L-shaped lower ledge.

14. The apparatus of claim 13, wherein the height for the connection of the interior weir to the L-shaped lower ledge is adjustable.

15. An apparatus comprising:
(a) a first inlet structure comprising:
(i) a rectangular top frame,
(ii) a plurality of side surfaces descending substantially downwardly from an outer perimeter of the rectangular top frame, wherein at least one side surface comprises a plurality of side openings positioned to permit substantially horizontal fluid flow therethrough, and
(iii) an inner flange disposed along an inner perimeter of the rectangular top frame;
(b) a second inlet structure comprising a cover panel and a plurality of top openings on the top surface of the cover panel, wherein the outer edge of the cover panel is disposed above the inner flange of the rectangular top frame; and
(c) a support structure disposed below the first and second inlet structures, the support structure comprising a substantially horizontal region and a substantially vertical region;
(d) wherein at least one side opening of the first inlet structure is in fluid communication with a bioretention swale.

16. The apparatus of claim 15, further comprising a walled collection basin disposed below the first and second inlet structures, wherein the walled collection basin comprises at least one outlet opening along a peripheral wall.

17. The apparatus of claim 16, wherein the support structure is connected to the walled collection basin at the substantially vertical region of the support structure.

18. The apparatus of claim 17, wherein the support structure is removeably connected to the walled collection basin at the substantially vertical region of the support structure.

19. The apparatus of claim 18, wherein the height for the connection of the support structure to the walled collection basin is adjustable.

20. The apparatus of claim 16, wherein the support structure is connected to the walled collection basin at the substantially horizontal region of the support structure.

21. The apparatus of claim 16, wherein the apparatus further comprises an interior weir removeably connected to an interior surface of the substantially vertical region of the support structure.

22. The apparatus of claim 21, wherein the height for the connection of the interior weir to the support structure is adjustable.

23. The apparatus of claim 21, wherein the top edge of the interior weir is disposed above the support structure, adjacent to at least a portion of a side surface, said apparatus further comprising filter media disposed between the interior weir and the side surface.

24. The apparatus of claim 15, wherein the side surfaces of the first inlet structure descend from an outer perimeter of the rectangular top frame at an angle measuring less than 90 degrees.

25. The apparatus of claim 15, wherein the substantially horizontal region of the support structure is formed from a substantially horizontal, inward extension of at least one side surface of the second inlet structure.

26. The apparatus of claim 15, wherein the first inlet structure and the support structure comprise a singular piece.

27. The apparatus of claim 15, further comprising a filter basket, wherein an outer edge of the filter basket rests on the inner flange of the rectangular top frame of the first inlet structure and below the second inlet structure.

28. A method of retaining gross pollutants within a bioretention swale, comprising the steps of:
(a) coupling a swale overflow screen device to a walled collection basin;
(b) placing the swale overflow screen device and walled collection basin within a bioretention swale;
(c) passing fluid through a plurality of openings along one or more substantially downwardly descending side surfaces of the swale overflow screen device;
(d) passing fluid through a plurality of openings along the top surface of the swale overflow screen device;
(e) releasing the filtered fluids from the walled collection basin to a storm water drainage system; and
(f) retaining gross pollutants in the bioretention swale.

29. The method of claim 28, further comprising the step of selecting the vertical distance of the side surfaces of the swale overflow screen device from a top surface of the bioretention swale.

30. The method of claim 29, wherein the swale overflow screen device is removeably connected to the walled collection basin at a substantially vertical region of the swale overflow screen device.

31. The method of claim 30, wherein the height of the connection of the walled collection basin to the swale overflow screen device is adjustable.

32. The method of claim 28, further comprising the step of passing fluid through a filter basket after it passes through the plurality of openings along the top surface of the swale overflow screen device.

33. The method of claim 28, wherein the openings along the top surface of the swale overflow screen device are disposed on a panel.

34. The method of claim 28, wherein the swale overflow screen device comprises:
(a) a rectangular top frame comprising at least one depressed surface along an inner perimeter of the rectangular top frame;
(b) a plurality of side surfaces descending substantially downwardly from an outer perimeter of the rectangular top frame, wherein at least one side surface comprises a plurality of side openings positioned to permit substantially horizontal fluid flow therethrough;
(c) an L-shaped lower ledge disposed below the plurality of side surfaces, the L-shaped ledge comprising a substantially horizontal region and a substantially vertical region; and
(d) a cover panel comprising a plurality of top openings, wherein at least a portion of the cover panel is impermeable to fluid flow and at least a portion of the panel is disposed above the depressed surface of the rectangular top frame.

35. The method of claim 34, wherein the swale overflow screen device is coupled to the walled collection basin at the substantially horizontal region of the swale overflow screen device.

36. The method of claim 34, further comprising the steps of adjusting the height of a top edge of an interior weir mounted a vertical wall of the swale overflow screen device and placing filter media in a space between the interior weir and the swale overflow screen device.

37. The method of claim 34, wherein the substantially horizontal region of L-shaped lower ledge is formed from a substantially horizontal, inward extension of at least one side surface.

38. The method of claim 34, wherein the walled basin is disposed on bedding.

39. The method claim 34, wherein the rectangular top frame, side surfaces, and L-shaped lower ledge comprise a singular piece.

40. The apparatus of claim 34, wherein the plurality of side surfaces descend from an outer perimeter of the rectangular top frame at an angle measuring less than 90 degrees.

\* \* \* \* \*